United States Patent [19]

Meisenburg et al.

[11] Patent Number: 5,834,555

[45] Date of Patent: Nov. 10, 1998

[54] AQUEOUS MULTICOMPONENT POLYURETHANE COATING COMPOSITION, PROCESS FOR ITS PREPARATION AND ITS USE IN METHODS OF PRODUCING A MULTICOAT FINISH

[75] Inventors: Uwe Meisenburg, Duisburg; Egbert Nienhaus, Ascheberg; Rolf Seidemann, Münster; Bernd Mayer, Münster, all of Germany; Anthony J. Tye, Toledo, Ohio

[73] Assignee: BASF Lacke + Farben, AG, Muenster-Hiltrup, Germany

[21] Appl. No.: 716,233

[22] PCT Filed: Mar. 16, 1995

[86] PCT No.: PCT/EP95/00974

§ 371 Date: Nov. 4, 1996

§ 102(e) Date: Nov. 4, 1996

[87] PCT Pub. No.: WO95/26384

PCT Pub. Date: Oct. 5, 1995

[30] Foreign Application Priority Data

Mar. 26, 1994 [DE] Germany .......................... 44 10 557.6

[51] Int. Cl.⁶ ................................ C08J 3/00; C08K 3/20; C08L 75/00; C08F 8/30
[52] U.S. Cl. ........................ 524/591; 428/423.1; 524/539; 524/839; 524/840; 525/123; 525/455
[58] Field of Search ..................... 524/591, 839, 524/840, 539; 525/123, 455; 428/423.1

[56] References Cited

U.S. PATENT DOCUMENTS 5,276,096  1/1994  Serdiuk et al. .
5,574,083  11/1996  Brown et al. ........................... 524/839
5,614,584  3/1997  Schwan et al. ......................... 524/839

FOREIGN PATENT DOCUMENTS 0 198 343 A2  4/1986  European Pat. Off. ........ C08G 18/77
0 324 370 A1  1/1989  European Pat. Off. .......... C09D 3/72
0 358 979 A2  8/1989  European Pat. Off. ....... C08G 175/04
3545891A1   7/1987  Germany ........................... C08F 2/06

*Primary Examiner*—Patrick D. Niland

[57] ABSTRACT

The present invention relates to an aqueous multicomponent polyurethane coating composition comprising A) a water-dilutable polyaddition resin (A1) and/or polycondensation resin (A2) containing hydroxyl and carboxylate groups and having an OH number of from 40 to 200 mg of KOH/g, preferably from 60 to 140 mg of KOH/g, an acid number of from 15 to 100 mg of KOH/g, preferably from 25 to 50 mg of KOH/g, and a glass transition temperature of from −40° C. to +60° C., preferably from −20° C. to +40° C., B) a polyisocyanate component (B) as crosslinking agent and C) at least one additive, characterized in that it contains as additive a carbodiimide component (C) which has a content of carbodiimide groups —N=C=N— of from 2 to 30% by weight, on average at least 0.8 carbodiimide groups per molecule and from 0 to 25% by weight, based on solids, of chemically incorporated ethylene oxide and/or propylene oxide units which are present within polyether chains, and/or a polyepoxide component (D).

24 Claims, No Drawings

AQUEOUS MULTICOMPONENT POLYURETHANE COATING COMPOSITION, PROCESS FOR ITS PREPARATION AND ITS USE IN METHODS OF PRODUCING A MULTICOAT FINISH

The present invention relates to an aqueous multicomponent polyurethane coating composition, comprising A) a water-dilutable polyaddition resin (A1) and/or polycondensation resin (A2) containing hydroxyl and carboxylate and/or sulfonate groups and having an OH number of from 40 to 200 mg of KOH/g, preferably from 60 to 140 mg of KOH/g, an acid number of from 15 to 100 mg of KOH/g, preferably from 25 to 50 mg of KOH/g, and a glass transition temperature of from −40° C. to +60° C., preferably from −20° C. to +40° C., B) a polyisocyanate component (B) as crosslinking agent and C) at least one additive.

The present invention further relates to a process for the preparation of these aqueous coating compositions and to their use in methods of producing a multicoat finish, and to coated articles in which at least one coat has been produced using these coating compositions.

For ecological and economic reasons the paint industry is making efforts to replace as great as possible a proportion of the organic solvents which are employed in paints by water. Especially in automotive finishing there is a great requirement for aqueous coatings. This applies both to the sector of production-line (OEM) automotive finishing and to the sector of automotive refinishing.

In this context aqueous coating compositions are employed in particular in the area of top coats. Top coats are understood here as being coating materials which are used to produce the topmost coat. This topmost coat may comprise one or more coats, especially two coats. Two-coat top coats are composed of a pigmented basecoat and of a clearcoat which is pigmented either not at all or only with transparent pigments and is applied over the basecoat.

Two-coat finishes are currently produced by the wet-on-wet method, in which a pigmented basecoat is initially applied and the resulting basecoat layer, without a baking step, is covered with a clearcoat, and then basecoat layer and clearcoat layer are cured together. This method is very advantageous in economic terms, but places stringent requirements on the basecoat and the clearcoat.

The clearcoat which is applied to the as yet uncured basecoat must neither partially dissolve nor otherwise perturb the basecoat layer, lest finishes of poor appearance be obtained. This applies in particular to finishes in which basecoats containing special-effect pigments (e.g. metallic pigments, especially aluminum flakes, or pearlescent pigments) are employed. Furthermore, the top coat compositions must be capable of being applied by spraying using automatic coating units. For this purpose their solids content at spray viscosity must be high enough for coating films of adequate thickness to be obtained with 1 to 2 spray passes (cross passes), and they must give baked coating films of good appearance (good evenness, high gloss, good top coat holdout and a high degree of hardness) and good weathering resistance.

In the area of automotive refinishing there is the additional requirement that the coating compositions employed are able to cure fully at low temperatures (generally <80° C.) and lead, even when fully cured at these low temperatures, to films having the good mechanical properties required.

EP-B-358 979 discloses aqueous two-component polyurethane coating compositions which comprise a hydroxyl group-containing polyacrylate resin and a polyisocyanate component. However, these coatings described in EP-B-358 979 exhibit great disadvantages with respect to weathering resistance, in particular with respect to their resistance in a constant humid climate (40° C., 240 h), and processability (fall in viscosity and too short pot life).

It is furthermore known, from EP-B-198 343, to add isocyanate derivatives containing carbodiimide groups to aqueous solutions of polymers which contain carboxyl groups, to improve the mechanical properties, especially the wet strength. However, when the carbodiimides described in EP-B-198 343 are used in aqueous polyurethane coating compositions, problems of compatibility with the binders occur and the resulting coatings have an inadequate weathering stability.

Moreover, EP-A-121 083 describes crosslinking agents based on carbodiimides, which are employed to crosslink aqueous resins containing carboxyl groups. The addition of carbodiimides to polyurethane coating compositions is not described in EP-A-121 083. Furthermore, the carbodiimides described in EP-A-121 083 are not polyether-modified. Rather, they are incorporated into aqueous dispersions using emulsifiers and water-miscible solvents.

In addition, EP-A-507 407 discloses coating compositions which contain as crosslinking agents carbodiimides which contain not only carbodiimide groups but also crosslinkable groups. By this means it is possible to avoid using a further crosslinking agent. The coating compositions known from EP-A-507 407 have the disadvantage, however, that their preparation is more time-consuming and cost-intensive than the mixing of different crosslinking agents having different functional groups. These coating compositions also have the disadvantage of a high VOC (Volatile Organic Content), since the processing of the coating compositions requires their dilution with organic solvents to a solids content of 50%. Furthermore, EP-A-507 407 contains no information on the short-term weathering stability of the coatings.

Finally, EP-A-516 277 discloses aqueous two-component polyurethane coatings which contain, as the component which is essential to the invention, a polyether-modified polyisocyanate. As binders these aqueous two-component coatings contain polyacrylate resins which are conventionally employed. The use of polyether-modified polyisocyanates has the disadvantage, however, that the resulting coatings have only a low weathering stability, and in particular poor results in the constant humid climate test.

The present invention is therefore based on the object of providing aqueous multicomponent polyurethane coating compositions of the type mentioned initially which, in relation to the known aqueous polyurethane coating compositions, have improved properties and/or give improved coating films. The new coating compositions should above all have an improved weathering stability. Despite hybrid crosslinking using two or more different crosslinking agents, the coating compositions should moreover possess the same ease of application as conventional 2-component PUR coating compositions.

The new coating compositions should also be suited to the area of automotive refinishing, i.e. they should be able to cure fully at low temperatures (generally <80° C.) and should lead to coatings which meet at least the requirements conventionally placed on an automotive refinish. The coating compositions should therefore have, for example, good evenness and good mechanical properties.

Surprisingly this object has been achieved by aqueous multicomponent polyurethane coating compositions of the type mentioned initially, which are characterized in that they contain as additive a carbodiimide component (C) which has a content of carbodiimide groups —N═C═N— of from 2 to 30% by weight, on average at least 0.8 carbodiimide groups per molecule and from 0 to 25% by weight, based on solids, of chemically incorporated ethylene oxide and/or propylene oxide units which are present within polyether chains, and/or a polyepoxide component (D).

The present invention relates furthermore to a process for the preparation of the aqueous multicomponent polyurethane coating compositions in which, shortly before application, a component which comprises the isocyanate group-containing crosslinking agent and the carbodiimide component is mixed with the component which comprises the water-dilutable binder. The invention also relates to a method of producing a multilayer, protective and/or decorative coating on a substrate surface, in which the top coat composition employed comprises the aqueous coating compositions according to the invention, and to the coated articles obtained by this method. Finally, the present invention also relates to the use of the aqueous coating compositions.

It is surprising and was unforeseeable that the aqueous polyurethane coating compositions obtained by using the carbodiimide component and/or the polyepoxide component, which is or are employed in accordance with the invention, have an improved weathering stability (i.e. good resistance in the constant humid climate test and in the water spray test). A further advantage is that the coating compositions according to the invention exhibit better leveling than conventional 2-component PUR coating compositions and that the coating compositions according to the invention possess the same ease of application as conventional 2-component PUR coating compositions.

A further advantage, finally, is that the coating compositions lead to coatings having good mechanical properties.

In the text below a closer description will first be given of the individual components of the aqueous coating composition according to the invention. Before the preparation of the polyacrylate resins to be employed in accordance with the invention is described more closely, two explanations of terms are dealt with beforehand:

1. (Meth)acrylic acid is occasionally used as an abbreviation for "methacrylic acid or acrylic acid".
2. The formulation "essentially free from carboxyl groups" is intended to express the fact that components (a1), (a2), (a4), (a5) and (a6) may have a small carboxyl group content (but no more than would give a polyacrylate resin prepared from these components a maximum acid number of 10 mg of KOH/g). It is preferred, however, for the carboxyl group content of components (a1), (a2), (a4), (a5) and (a6) to be kept as low as possible. It is particularly preferred to employ carboxyl group-free components (a1), (a2), (a4), (a5) and (a6).

The coating compositions according to the invention contain as binder a water-dilutable polyaddition resin (A1) and/or polycondensation resin (A2) which contains hydroxyl and carboxylate and/or sulfonate groups and has an OH number of from 40 to 200 mg of KOH/g, preferably from 60 to 140 mg of KOH/g, an acid number of from 15 to 100 mg of KOH/g, preferably from 25 to 50 mg of KOH/g, and a glass transition temperature of from −40° C. to +60° C., preferably from −20° C. to +40° C.

The polycondensation resins which are suitable as binders are known perse [sic] and are described in, for example, EP-A-542 105. Polyester resins are preferably employed as (A2). The sulfonate groups can be introduced into the polyester by using, for example, 5-(lithiumsulfo)isophthalic acid.

Polyacrylate resins are preferably employed as binders in the coating compositions according to the invention. These polyacrylate resins are preferably prepared by polymerizing, in an organic solvent or solvent mixture and in the presence of at least one polymerization initiator, a1) a (meth)acrylate which is different from (a2), (a3), (a4), (a5) and (a6), is copolymerizable with (a2), (a3), (a4), (a5) and (a6) and is essentially free from carboxyl groups, or a mixture of such monomers, a2) an ethylenically unsaturated monomer which is copolymerizable with (a1), (a2) [sic], (a3), (a4), (a5) and (a6), is different from (a5), carries at least one hydroxyl group per molecule and is essentially free from carboxyl groups, or a mixture of such monomers, a3) an ethylenically unsaturated monomer which carries at least one carboxyl group and/or sulfonate group per molecule and is copolymerizable with (a1), (a2), (a4), (a5) and (a6), or a mixture of such monomers, and a4) if desired one or more vinyl esters of α-branched monocarboxylic acids having from 5 to 18 carbon atoms per molecule, and/or a5) if desired at least one reaction product of acrylic acid and/or methacrylic acid with the glycidyl ester of an α-branched monocarboxylic acid having from 5 to 18 carbon atoms per molecule, or, instead of the reaction product, an equivalent amount of acrylic and/or methacrylic acid which is then reacted during or after the polymerization reaction with the glycidyl ester of an α-branched monocarboxylic acid having from 5 to 18 carbon atoms per molecule, a6) if desired an ethylenically unsaturated monomer which is copolymerizable with (a1), (a2), (a3), (a4) and (a5), is different from (a1), (a2), (a4) and (a5) and is essentially free from carboxyl groups, or a mixture of such monomers, and, after the end of the polymerization, at least partially neutralizing the resulting polyacrylate resin and dispersing it in water, the nature and quantity of (a1), (a2), (a3), (a4), (a5) and (a6) being selected such that the polyacrylate resin (A1) has the desired OH number, acid number and glass transition temperature.

The preparation of the polyacrylate resins which are employed in accordance with the invention may employ as component (a1) any ester of (meth)acrylic acid which is copolymerizable with (a2), (a3), (a4), (a5) and (a6) and is essentially free from carboxyl groups, or a mixture of such (meth)acrylates. Examples are alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate, and cycloaliphatic (meth)acrylates such as cyclohexyl methacrylate. It is preferred to employ as component (a1) mixtures of alkyl acrylates and/or alkyl methacrylates, of which at least 20% by weight are composed of n-butyl and/or t-butyl acrylate and/or n-butyl and/or t-butyl methacrylate.

As component (a1) it is also possible to employ ethyltriglycol (meth)acrylate and methoxyoligoglycol (meth)acrylate having a number-average molecular weight of preferably 550 or other ethoxylated and/or propoxylated derivatives of (meth)acrylic acid which are free from hydroxyl groups.

As component (a2) it is possible to employ ethylenically unsaturated monomers which are copolymerizable with (a1), (a2) [sic], (a3), (a4), (a5) and (a6), are different from (a5), carry at least one hydroxyl group per molecule and are essentially free from carboxyl groups, or a mixture of such monomers. Examples are hydroxyalkyl esters of acrylic acid, methacrylic acid or another α,β-ethylenically unsaturated carboxylic acid. These esters may be derived from an alkylene glycol which is esterified with the acid, or they may be obtained by reacting the acid with an alkylene oxide. As component (a2) it is preferred to employ hydroxyalkyl esters of acrylic acid or methacrylic acid in which the hydroxyalkyl group contains up to 20 carbon atoms, reaction products of cyclic esters, e.g. ε-caprolactone, and these hydroxyalkyl esters, or mixtures of these hydroxyalkyl esters and/or ε-caprolactone-modified hydroxyalkyl esters.

Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, hydroxystearyl acrylate and hydroxystearyl methacrylate. Corresponding esters of other unsaturated acids, for example ethacrylic acid, crotonic acid and similar acids having up to about 6 carbon atoms per molecule, can also be employed. It is also possible to employ olefinically unsaturated polyols as component (a2). Preferred polyacrylate resins (A) are obtained when trimethylolpropane monoallyl ether is employed as at least part of component (a2). The proportion of trimethylolpropane monoallyl ether is usually from 2 to 10% by weight, based on the total weight of the monomers (a1) to (a6) employed in the preparation of polyacrylate resin. In addition, however, it is also possible to add from 2 to 10% by weight, based on the total weight of the monomers employed in the preparation of the polyacrylate resin, of trimethylolpropane monoallyl ether to the finished polyacrylate resin. The olefinically unsaturated polyols such as, in particular, trimethylolpropane monoallyl ether may be employed as the sole hydroxyl group-containing monomer, but are employed in particular in proportions in combination with other of the hydroxyl group-containing monomers mentioned.

As component (a3) any ethylenically unsaturated monomer which carries at least one sulfonyl and/or carboxyl group per molecule and is copolymerizable with (a1), (a2), (a4), (a5) and (a6), or a mixture of such monomers, can be employed. It is preferred to employ acrylic acid and/or methacrylic acid as component (a3). However, it is also possible to employ other ethylenically unsaturated acids having up to 6 carbon atoms in the molecule. Examples of such acids are ethacrylic acid, crotonic acid, maleic acid, fumaric acid and itaconic acid. It is also possible to employ as component (a3) mono(meth)acryloyloxyethyl maleate, mono(meth)acryloyloxyethyl succinate and mono(meth)acryloyloxyethyl phthalate. Examples of monomers containing sulfonyl groups are 2-acrylamido-2-methylpropanesulfonic acid and vinylsulfonic acid.

As component (a4) one or more vinyl esters of α-branched monocarboxylic acids having from 5 to 18 carbon atoms in the molecule are employed. The branched monocarboxylic acids can be obtained by reacting formic acid or carbon monoxide and water with olefins in the presence of a liquid, strongly acid catalyst; the olefins may be products from the cracking of paraffinic hydrocarbons such as mineral oil fractions, and may contain both branched and straight-chain acyclic and/or cycloaliphatic olefins. The reaction of such olefins with formic acid or with carbon monoxide and water produces a mixture of carboxylic acids in which the carboxyl groups are predominantly located on a quaternary carbon atom. Examples of other olefinic starting substances are propylene trimer, propylene tetramer and diisobutylene. The vinyl esters may, however, also be prepared from the acids in a manner known per se, for example by reacting the acid with acetylene.

Because of their ready availability, it is particularly preferred to employ vinyl esters of saturated aliphatic monocarboxylic acids having from 9 to 11 carbon atoms, which are branched on the α carbon atom.

As component (a5) the reaction product of acrylic acid and/or methacrylic acid with the glycidyl ester of an α-branched monocarboxylic acid having from 5 to 18 carbon atoms per molecule is employed. Glycidyl esters of strongly branched monocarboxylic acids can be obtained under the trade name "Cardura". The acrylic or methacrylic acid can be reacted with the glycidyl ester of a carboxylic acid having a tertiary α carbon atom before, during or after the polymerization reaction. Preference is given to employing as component (a5) the reaction product of acrylic and of methacrylic acid with the glycidyl ester of Versatic acid. This glycidyl ester is commercially available under the name "Cardura E10".

As component (a6) it is possible to employ all ethylenically unsaturated monomers which are copolymerizable with (a1), (a2), (a3), (a4) and (a5), are different from (a1), (a2), (a3) and (a4) and are essentially free from carboxyl groups, or mixtures of such monomers. Preferably employed as component (a6) are vinyl aromatic hydrocarbons such as styrene, α-alkylstyrene and vinyltoluene.

As component (a6) it is also possible to employ, in combination with other monomers mentioned as being suitable as component (a6), polysiloxane macromonomers. Suitable polysiloxane macromonomers are those having a number-average molecular weight of from 1000 to 40,000, preferably from 2000 to 10,000, and on average from 0.5 to 2.5 and preferably 0.5 to 1.5 ethylenically unsaturated double bonds per molecule. Suitable examples are the polysiloxane macromonomers described in DE-A-38 07 571 on pages 5 to 7, in DE-A-37 06 095 in columns 3 to 7, in EP-B 358 153 on pages 3 to 6 and in U.S. Pat. No. 4,754,014 in columns 5 to 9. Also suitable, furthermore, are other acryloxysilane-containing vinyl monomers having the abovementioned molecular weights and contents of ethylenically unsaturated double bonds, for example compounds which can be prepared by reacting hydroxy-functional silanes with epichlorohydrin and subsequently reacting the reaction product with methacrylic acid and/or hydroxyalkyl esters of (meth)acrylic acid.

Preferred polysiloxane macromonomers for employment as component (a6) are those of the following formula:

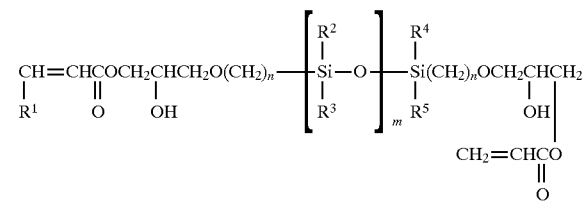

where $R^1$=H or $CH_3$ $R^2$, $R^3$, $R^4$, $R^5$=identical or different aliphatic hydrocarbon radicals having from 1 to 8 carbon atoms, especially methyl, or a phenyl radical.

n=from 2 to 5, preferably 3 m=from 8 to 30

Particular preference is given to employing the α, -acryloxy [sic] organo-functional polydimethyl-siloxane of the formula

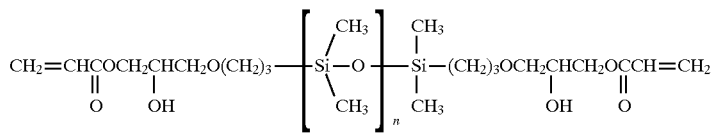

where n≈9, with an acryloxy equivalent of 550 g per equivalent, an OH number of 102 mg of KOH/g and a viscosity of 240 mPas (25° C.).

Also preferably employed as component (a6) are polysiloxane macromonomers which have been prepared by reacting from 70 to 99.999 mol-% of a compound (1), represented by the formula (I)

in which $R^1$ represents an aliphatic hydrocarbon group having from 1 to 8 carbon atoms or a phenyl radical and $R^2$, $R^3$ and $R^4$ each represent a halogen radical or an alkoxy radical having 1 to 4 carbon atoms, or a hydroxyl group, with from 30 to 0.001 mol-% of a compound (2), represented by the formula (II)

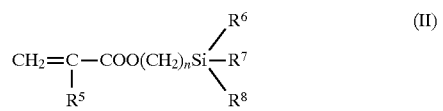

in which $R^5$ represents a hydrogen atom or a methyl radical, $R^6$, $R^7$ and $R^8$ each represent halogen, OH— or an alkoxy radical having from 1 to 4 carbon atoms, or an aliphatic hydrocarbon group having from 1 to 8 carbon atoms, at least one of the radicals $R^6$, $R^7$ or $R^8$ representing OH— or an alkoxy group and n representing an integer from 1 to 6.

Examples of suitable compounds (1) and (2) are mentioned in WO 92/22615 on page 13, line 18 to page 15, line 9.

The reaction between compounds (1) and (2) is brought about by the dehydrating condensation of the hydroxyl groups which these compounds contain and/or the hydroxyl groups which can be attributed to the hydrolysis of the alkoxy groups in these compounds. Depending on the reaction conditions the reaction comprises in addition to the dehydration reaction a dealcoholizing [sic] condensation. If compounds (1) or (2) contain halogen radicals the reaction between (1) and (2) is brought about by dehydrohalogenation.

The conditions under which the reaction between compound (1) and compound (2) is carried out are likewise described in the international patent application having the international publication no. WO 92/22615 on page 15, line 23 to page 18, line 10.

The amount of the polysiloxane macromonomer(s) (a6) employed to modify the acrylate copolymers (A1) is less than 5% by weight, preferably from 0.05 to 2.5% by weight and particularly preferably from 0.05 to 0.8% by weight, based in each case on the total weight of the monomers employed in the preparation of the copolymer (A1).

The use of such polysiloxane macromonomers leads to an improvement in the slip of the aqueous polyurethane coating composition.

The nature and quantity of components (a1) to (a6) is selected such that the polyacrylate resin (A1) has the desired OH number, acid number and glass transition temperature.

Particular preference is given to employing acrylate resins obtained by polymerizing (a1) from 20 to 60% by weight, preferably from 30 to 50% by weight, of component (a1)

(a2) from 10 to 40% by weight, preferably from 15 to 35% by weight, of component (a2)

(a3) from 1 to 15% by weight, preferably from 2 to 8% by weight, of component (a3) and (a4) from 0 to 25% by weight, preferably from 2 to 15% by weight, of component (a4)

(a5) from 0 to 25% by weight, preferably from 2 to 15% by weight, of component (a5)

(a6) from 5 to 30% by weight, preferably from 10 to 20% by weight, of component (a6), the sum of the proportions by weight of components (a1) to (a6) being in each case 100% by weight.

The polyacrylate resins (A1) employed in accordance with the invention are prepared in an organic solvent or solvent mixture and in the presence of at least one polymerization initiator. The organic solvents and polymerization initiators employed are those solvents and polymerization initiators which are conventional for the preparation of polyacrylate resins and suitable for the preparation of aqueous dispersions. Examples of solvents which can be used are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, ethyl 2-hydroxypropionate and 3-methyl-3-methoxybutanol, and derivatives based on propylene glycol, for example ethyl ethoxypropionate, methoxypropyl acetate, dipropylene glycol monomethyl ether and the like. Examples of polymerization initiators which can be used are free radical initiators such as, for example, t-butyl perethylhexanoate, benzoyl peroxide, azobisisobutyronitrile and t-butyl perbenzoate. The polymerization is expediently carried out at a temperature of from 80° to 160° C., preferably from 110° to 160° C. The preferred solvents employed are ethoxyethyl propionate, dipropylene glycol monomethyl ether and butyl acetate.

The polyacrylate resin (A1) is preferably prepared by a two-stage process, since in this way the resulting aqueous coating compositions have a better processability. Preference is therefore given to employing polyacrylate resins which can be obtained by I. polymerizing a mixture of (a1), (a2), (a4), (a5) and (a6), or a mixture of part-amounts of components (a1), (a2), (a4), (a5) and (a6) in an organic solvent, II. after at least 60% by weight of the mixture composed of (a1), (a2), (a4), (a5) and if desired (a6) have been added, adding (a3) and any remaining amount of components (a1), (a2), (a4), (a5) and (a6) and continuing polymerization, and III. after the end of the polymerization, at least partially neutralizing the resulting polyacrylate resin and dispersing it in water.

In addition, however, it is also possible initially to charge components (a4) and/or (a5) together with at least a part-amount of the solvent and to meter in the remaining components. Furthermore it is also possible to include in the initial charge only part of components (a4) and/or (a5) together with at least part of the solvent, and to add the remainder of these components as described above. It is preferred, for example, initially to charge at least 20% by weight of the solvent and about 10% by weight of components (a4) and (a5) and if desired part-amounts of components (a1) and (a6).

Also preferred is the preparation of the polyacrylate resins (A1) which are employed in accordance with the invention by a two-stage process in which stage (I) lasts from 1 to 8 hours, preferably from 1.5 to 4 hours, and the addition of the mixture of (a3) and any remaining amounts of components (a1), (a2), (a4), (a5) and (a6) is made over a period of from 20 to 120 min, preferably over a period of from 30 to 90 min. When the addition of the mixture of (a3) and any remaining amounts of components (a1), (a2), (a4), (a5) and (a6) is complete polymerization is continued until all of the monomers employed have undergone essentially complete reaction.

The quantity and rate of addition of the initiator is preferably chosen such that a polyacrylate resin (A1) having a number-average molecular weight of from 2500 to 20,000 is obtained. It is preferred to commence the addition of the initiator about 5 minutes before adding the monomers and to terminate it about half an hour after the addition of the monomers has been ended. The initiator is preferably added in a constant quantity per unit time. When the addition of initiator has ended the reaction mixture is maintained at polymerization temperature for a time (generally 1½ h) until all the monomers employed have undergone essentially complete reaction. "Essentially complete reaction" is intended to denote that preferably 100% by weight of the monomers employed have been reacted, but that it is also possible for a small proportion of residual monomer of no more than up to about 0.5% by weight, based on the weight of the reaction mixture, possibly to remain unreacted.

The resulting polyacrylate resin (A1) has an OH number of from 40 to 200 and preferably from 60 to 140 mg of KOH/g, an acid number of from 20 to 100 mg of KOH/g, preferably from 25 to 50 mg of KOH/g, and a glass transition temperature of from −40° to +60° C., preferably from −20° to +40° C. This glass transition temperature can be calculated by the following formula:

$$\frac{1}{Tg} \sum_{n=1}^{n=x} \frac{Wn}{Tgn}$$

Tg=glass transition temperature of the polyacrylate resin (A)

X=number of different monomers copolymerized in the polyacrylate resin

Wn=weight proportion of the nth monomer

Tgn=glass transition temperature of the homopolymer of the nth monomer

For calculating the glass transition temperature the Tg of the homopolymer of the reaction product of acrylic acid and Cardura E10 is taken to be equal to the glass transition temperature of the homopolymer of isodecyl methacrylate (−41° C.).

When the polymerization is over the resulting polyacrylate resin is at least partially neutralized and dispersed in water. The degree of neutralization to be applied in each case depends on the acid number of the acrylate and is in general, for acid numbers <70 mg of KOH/g, between 50 and 90% and, for acid numbers >70 mg of KOH/g, between 30 and 80%. Both organic bases and inorganic bases can be used for the neutralization. It is preferred to use primary, secondary and tertiary amines such as, for example, ethylamine, propylamine, dimethylamine, dibutylamine, cyclohexylamine, benzylamine, morpholine, piperidine, diethanolamine and triethanolamine. It is particularly preferred to employ tertiary amines as neutralizing agents, in particular dimethylethanolamine, triethylamine, dimethylisopropylamine, tripropylamine and tributylamine.

The neutralization reaction is generally carried out by mixing the neutralizing base with the polyacrylate resin. In this context it is preferred to employ a quantity of base such that the top coat composition has a pH of from 7 to 8.5, preferably from 7.2 to 7.8.

The partially or completely neutralized polyacrylate resin is then dispersed by adding water. This produces an aqueous polyacrylate resin dispersion. If desired some or all of the organic solvent can be distilled off. The polyacrylate resin dispersions according to the invention contain polyacrylate resin particles whose average size is preferably between 60 and 300 nm (method of measurement: laser diffraction; measuring instrument: Malvern Autosizer 2 C). The polyacrylate resin (A1) employed in accordance with the invention is conventionally employed in the coating compositions in an amount of from 30 to 50% by weight (calculated as solids, i.e. without the water content), based on the total weight of the coating composition.

The polyisocyanate component (B) is any organic polyisocyanate having free isocyanate groups which are bonded to aliphatic, cycloaliphatic, araliphatic and/or aromatic structures. Preferably employed are polyisocyanates having from 2 to 5 isocyanate groups per molecule and having viscosities of from 200 to 2000 mPas (at 23° C.). If desired small amounts of organic solvent may also be added to the polyisocyanates, preferably from 1 to 25% based on pure polyisocyanate, in order thus to improve the ease of incorporation of the isocyanate and if appropriate to reduce the viscosity of the polyisocyanate to a value within the above-mentioned ranges. Examples of solvents which are suitable as additives for the polyisocyanates are ethoxyethyl propionate, butyl acetate and the like.

Examples of suitable isocyanates are described by way of example in "Methoden der organischen Chemie", Houben-Weyl, volume 14/2, 4th edition, Georg Thieme Verlag, Stuttgart 1963, page 61 to 70, and by W. Siefken, Liebigs Ann. Chem. 562, 75 to 136. Suitable examples are 1,2-ethylene diisocyanate, 1,4-tetramethylene diisocyanate, 1,6-hexamethylene diisocyanate, 2,2,4- or 2,4,4-trimethyl-1,6-hexamethylene diisocyanate, 1,12-dodecane diisocyanate, ω,ω'-diisocyanatodipropyl ether, cyclobutane 1,3-dilsocyanate, cyclohexane 1,3- and 1,4-diisocyanate, 2,2- and 2,6-diisocyanato-1-methylcyclo-hexane, 3-isocyanatomethyl-3,5,5-trimethylcyclohexyl isocyanate (isophorone diisoyanate" [sic]), 2,5- and 3,5-bis(isocyanatomethyl)-8-methyl-1,4-methano-decahydronaphthalene, 1,5-, 2,5-, 1,6- and 2,6-bis(isocyanatomethyl)-4,7-methanohexahydroindane, 1,5-, 2,5-, 1,6- and 2,6-bis(isocyanato)-4,7-methanehexahydro-indane, dicyclohexyl 2,4'- and 4,4'-diisocyanate, 2,4-and 2,6-hexahydrotolylene diisocyanate, perhydro-2,4'-and -4,4'-diphenylmethane diisocyanate, ω,ω'-diisocya-nato-1,4-diethylbenzene, 1,3- and 1,4-phenylene diisocyanate, 4,4'-diisocyanato-biphenyl, 4,4'-diisocy-anato-3,3'-dichlorobiphenyl, 4,4'-diisocyanato-3,3'-dimethoxy-biphenyl, 4,4'-diisocyanato-3,3'-dimethylbiphenyl, 4,4'-diisocyanato-3,3'-diphenyl-biphenyl, 2,4'- and 4,4'- diisocyanato-diphenylmethane, naphthylene 1,5-diisocyanate, tolylene diisocyanates such as 2,4- and 2,6-tolylene diisocyanate, N,N'-(4,4'-dimethyl-3,3'-diisocyanatodiphenyl)uretdione, mxylylene diisocyanate, dicyclohexylmethane diisocyanate, tetramethylxylylene diisocyanate, but also triisocyanates such as 2,4,4'-triisocyanatodiphenyl ether and 4,4',4"-triisocyanatotriphenylmethane. It is also possible to employ polyisocyanates having isocyanurate groups and/or biuret groups and/or allophanate groups and/or urethane groups and/or urea groups. Polyisocyanates having urethane groups are obtained, for example, by reacting some of the isocyanate groups with polyols such as, for example, trimethylolpropane and glycerol.

Aliphatic or cycloaliphatic polyisocyanates are preferably employed, especially hexamethylene diisocyanate, dimerized and trimerized hexamethylene diisocyanate, isophorone diisocyanate, dicyclohexyl-methane 2,4'-diisocyanate or dicyclohexylmethane 4,4'-diisocyanate or mixtures of these polyisocyanates. Very particular preference is given to employing mixtures of polyisocyanates based on hexamethylene diisocyanate which contain uretdione and/or isocyanurate groups and/or allophanate groups, as are formed by catalytic oligomerization of hexamethylene diisocyanate using suitable catalysts. Polyisocyanate component (B) may otherwise be composed of any desired mixtures of the polyisocyanates mentioned by way of example.

It is essential to the invention that the coating compositions contain a carbodiimide component (C) and/or a polyepoxide component (D). The coating compositions preferably contain a carbodiimide component (C) or a mixture of a carbodiimide component (C) and a polyepoxide component (D). The carbodiimide component (C) which is employed may in each case be a carbodiimide or else a mixture of 2 or more carbodiimides. Likewise, the polyepoxide component (D) which is employed may in each case be a polyepoxide or a mixture of 2 or more polyepoxides.

The carbodiimides which are employed in accordance with the invention have the following characteristic properties:

1. The incorporation of hydrophilic ethylene oxide and/or propylene oxide units enables the carbodiimides employed in accordance with the invention to be added without problems to aqueous solutions and, in particular, dispersions of synthetic resins containing carboxylate and/or carboxyl groups and/or sulfonate groups.

2. In dependence on the content of carbodiimide groups in the carbodiimide component employed in accordance with the invention, which content can easily be varied by a simple choice of the nature and proportions of the starting materials employed, the degree of crosslinking of the two-dimensional structure ultimately obtained can be adjusted.

Starting materials for the carbodiimides employed in accordance with the invention are:

a) organic polyisocyanates having an average NCO functionality of from 2.0 to 2.5 or mixtures of organic poly- and monoisocyanates having an average functionality of from 1.3 to 2.5 and, if desired, b) compounds which are mono- or polyfunctional in terms of the isocyanate addition reaction and have groups which are reactive toward isocyanate groups.

Structural components a) include:

a1) any desired aliphatic and/or cycloaliphatic and/or aromatic polyisocyanates such as, in particular, the diisocyanates which are easily accessible industrially such as hexamethylene diisocyanate, 1-isocyanato-3,3,5-trimethyl-5-isocyanatomethylcy-clohexane and m-tetramethylenexylylene diisocyanate (m-TMXDI).

If aromatic polyisocyanates are employed then it is preferred to employ those in which the isocyanate groups are bonded to aliphatic radicals. Particularly preferred isocyanates for preparing the carbodiimides are those of the general formula (I)

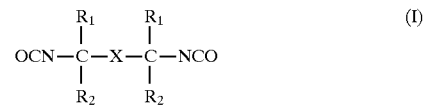

in which X represents a divalent, aromatic hydrocarbon radical, preferably for a naphthylene, diphenylene or 1,2-, 1,3- or 1,4-phenylene radical which is optionally substituted by halogen, methyl or methoxy, particularly preferably a 1,3-phenylene radical, and $R_1$ and $R_2$ represent an alkyl radical having 1–4 carbon atoms, preferably a methyl radical. Diisocyanates of the formula (I) are known (their preparation is described in, for example, EP-A-101 832, U.S. Pat. Nos. 3,290,350, 4,130,577 and 4,439,616) and some are commercially available (1,3-bis-(2-isocyanatoprop-2-yl)benzene for example is sold by the American Cyanamid Company under the trade name TMXDI (META)®).

The exclusive employment is preferred, as component (a1), of a diisocyanate of the formula (I) or a mixture of such diisocyanates. It is particularly preferred to employ as component (a1) a diisocyanate of the formula (II)

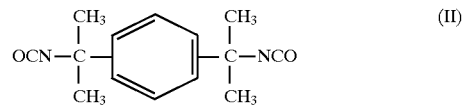

These isocyanates are also designated as tetramethylxylylene diisocyanates (TMXDI). Very particular preference is given to the employment as component (a1) of a diisocyanate of the formula (II) in which the —C(CH3)$_2$NCO groups are in the meta position (MTMXDI).

Further starting materials (a) are:

a2) Hydrophilically modified polyisocyanates.

These include mono- or diisocyanates which contain polyethylene oxide and/or polypropylene oxide units incorporated within polyether chains, as are described in, for example, DE-A-23 14 512, DE-A-23 14 513, DE-A-25 51 094, DE-A-26 51 506, U.S. Pat. Nos. 3,920,598 or 3,905,929.

Particularly preferred hydrophilically modified polyisocyanates, however, are NCO prepolymers as are obtained by reacting excess amounts of the diisocyanates mentioned as examples under a1) with diols. In the preparation of these NCO prepolymers the starting materials are generally brought to reaction while observing a ratio of NCO to OH equivalents of from 1.2:1 to 10:1 at from 20° to 150° C.

Diols which are suitable for the preparation of NCO prepolymers are in particular those of the general formula

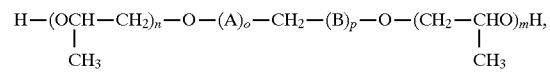

in which A and B represent identical or different divalent aliphatic hydrocarbon radicals having from 1 to 6 carbon atoms, R represents hydrogen, an aliphatic hydrocarbon radical having from 1 to 4 carbon atoms or a phenyl radical, n and m represent identical or different numbers from 0 to 30 and o and p each represent 0 or 1.

Further starting materials (a) are, for example:

a3) organic monoisocyanates, such as, for example, n-hexyl isocyanate, phenyl isocyanate or p-tolyl isocyanate. As already mentioned above these monoisocyanates are possibly employed as a mixture with organic polyisocyanates of the kind mentioned by way of example, the mixture having an average NCO functionality of from 1.3 to 2.5, preferably from 1.3 to 2.

In addition, other modified polyisocyanates may also be present in component (a), for example reaction products of excess amounts of organic diisocyanates of the kind mentioned by way of example under (a1) with di- or trihydroxy-alkanes having a molecular weight of less than 400, for example ethylene glycol, propylene glycol, tetramethylene diols, hexamethylene diols, trimethylolpropane and/or glycerol.

Examples of the structural components (b) which are also used if desired are b1) polyhydric, especially dihydric alcohols, for example ethylene glycol, propylene glycol, tetramethylene diols, hexamethylene diols, octamethylene diols, neopentyl glycol, 2-methyl-1,3-dihydroxypropane, glycerol, trimethylolpro-pane, diethylene glycol, triethylene glycol, tetraethylene glycol, polyethylene glycols of the molecular weights mentioned, dipropylene glycol, tripropylene glycol or any desired mixtures of such polyhydric alcohols.

It is preferred to employ methoxypolyethylene glycol having an average molecular weight of 550 g/mol with 1 free OH group and 1 methyl-etherified OH group.

Examples of further structural components (b) which are also used if desired are:

b2) Hydrophilically modified mono- or dihydric alcohols, for example the compounds which have ethylene oxide units and the general formula

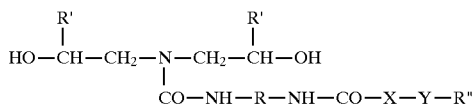

in which

R [lacuna] a divalent radical as obtained by removing the isocyanate groups from a diisocyanate of the formula R(NCO)2 of the kind mentioned above under (a1), R' [lacuna] hydrogen or a monovalent hydrocarbon radical having 1–8 carbon atoms, preferably hydrogen or a methyl group, R" [lacuna] a monovalent hydrocarbon radical having 1–12 carbon atoms, preferably an unsubstituted alkyl radical having 1–4 carbon atoms, X [lacuna] a polyalkylene oxide chain having 5–90 and preferably 20 to 70 chain members of which at least 40%, preferably at least 65%, are composed of ethylene oxide units and which in addition to ethylene oxide units may also represent propylene oxide, butylene oxide or styrene oxide units, with propylene oxide units being preferred among the last-mentioned units, Y [lacuna] oxygen or —NR'"—, where R'" in terms of its definition corresponds to R".

The compounds of the abovementioned formulae may be prepared in accordance with the procedures of DE-A-23 14 512 and/or DE-A-23 14 513; in order to supplement the disclosure made therein reference is made to the fact that, instead of the monofunctional polyether alcohols mentioned therein as starting material, it is also possible to employ those polyether alcohols whose polyether segment also has, in addition to ethylene oxide units, 60% by weight based on the polyether segment of a [sic] propylene oxide, butylene oxide or styrene oxide, preferably propylene oxide units.

The proportion of such "mixed polyether segments" may in specific cases be accompanied by specific advantages.

Examples of the hydrophilic monohydric alcohols which are suitable in accordance with the invention include compounds of the formula H—X—Y—R", in which X, Y and R" have the meaning just mentioned.

These monohydric, hydrophilically modified alcohols can be prepared by the methods described in U.S. Pat. Nos. 3,905,929 or 3,920,538, for example by the alkoxylation of suitable starter molecules, for example n-butanol with ethylene oxide and if desired other alkylene oxides, for example propylene oxide.

The isocyanate derivatives which contain carbodiimide groups, are employed in accordance with the invention and are prepared from the starting materials mentioned by way of example have a content of from 2 to 30% by weight, preferably from 5 to 15% by weight, of carbodiimide groups —N=C=N—, and have on average per molecule from 0.8 to 30, preferably from 1 to 25 and particularly preferably from 1.3 to 20 such carbodiimide groups. Their content of incorporated ethylene oxide units present within polyether chains is from 0 to 25% by weight, preferably from 2 to 20% by weight and particularly preferably from 5 to 15% by weight, based on solids. The hydrophilic groups mentioned are preferably present in the carbodiimides in amounts so as to ensure their solubility or dispersibility in water. It is however also possible, but by no means preferred, to use—in addition to the chemically incorporated, hydrophilic groups mentioned—external emulsifiers which are mixed with the carbodiimides in order to ensure their solubility or dispersibility in water.

Examples of such emulsifiers are ethoxylated nonylphenol, polyoxyethylene, lauryl ethers or polyoxyethylene laurate, oleat or stearate, these compounds generally having from 8 to 50 oxyethylene units per molecule.

The fact that the carbodiimides contain the groups mentioned which are essential to the invention is ensured by the corresponding choice of the nature and proportions of the starting materials and of the degree of carbodiimidization. The term degree of carbodiimidization is to be understood here as meaning the percentage of isocyanate groups, present in the starting isocyanates (a), which undergo the carbodiimidization reaction. The compounds employed in accordance with the invention preferably have no further free isocyanate groups after their preparation.

The compounds employed in accordance with the invention can be prepared by different variants.

The most simple method of preparation comprises reacting mixtures of organic polyisocyantes [sic], preferably diisocyanates, with complete carbodiimidization of the isocyanate groups, polyether alcohols or alcohols containing ethylene oxide units also being employed in a quantity such that the resulting product has a content of ethylene oxide groups which is within the abovementioned limits, and the proportion of polyisocyanate to monoisocyanate, i.e. the average functionality of the isocyanate mixture, being chosen such that chain termination takes place during the carbodiimidization reaction, so that the resulting products have a content of carbodiimide groups which is within the abovementioned ranges.

Chain termination of this kind always occurs when the average NCO functionality is less than 2.0. Thus by simply choosing the average NCO functionality of the isocyanates employed as component (a) it is possible to adjust the molecular weight and thus the number of carbodiimide groups present on average in the process products.

According to a further variant only some of the isocyanate groups of starting component (a) are carbodiimidized, and the free isocyanate groups which are then still present are reacted with groups which are reactive towards isocyanate groups, of the kind mentioned above by way of example under (b), the degree of carbodiimidization of the first stage of the reaction being chosen such that the quantity of carbodiimide groups present in the ultimate process product obtained corresponds to the statements made above. In this context the quantity of component (b) is always such that, for each isocyanate group of the partially carbodiimidized isocyanate, at least 1 group which is reactive towards isocyanate groups is available.

The number of carbodiimide groups present on average in the process products can also in this context be predetermined by a suitable choice of the functionality of the starting components, i.e. by adjusting the molecular weight as is possible in this way. If, for example, the number of carbodiimide groups in the partially carbodiimidized isocyanate has already been reached, then a chain-lengthening reaction will be avoided in the reaction with component (b), i.e. exclusively chain-terminating structural components of the type mentioned by way of example will be used as component (b). Conversely, if at least a proportion of difunctional structural components (b) is used, a chain lengthening reaction can be induced by means of which, of course, on average the number of carbodiimide groups present per molecule in the process products is increased.

In this varianat [sic] of the process component (a) preferably possesses prior to the carbodiimidization reaction an NCO functionality of from 1.8 to 2.5. Using this procedure it is also possible to prepare valuable process products which have a multiplicity of carbodiimide units, corresponding on average to the statements made above with respect to the number of carbodiimide units.

The ethylene oxide units which may if desired be present in the process products are also incorporated into the process product, in the second variant of the preparation process, by the additional use of components (a) containing ethylene oxide units and/or by the additional use of components (b) which contain ethylene oxide units and are of the kind mentioned above by way of example.

In both variants of the process the at least partial carbodiimidization of the isocyanate groups of component (a) is carried out in a manner known per se, for example in analogy with the previously known teaching of the prior art, as is evident for example from U.S. Pat. Nos. 2,840,589, 2,941,966 or German Offenlegungsschriften 25 04 400, 25 52 350 or 26 53 120. The at least partial carbodiimidization of the isocyanate groups of component (a) is carried out particularly advantageously using carbodiimidization catalysts as are described, for example, in U.S. Pat. Nos. 2,941,966, 2,853,581 or 2,853,473 or in DE-A-26 14 323. The carbodiimidization is particularly preferably carried out using 1-methyl-1-phospha-2-cyclopentene 1-oxide or 1-methyl-1-phospha-3-cyclopentene 1-oxide or mixtures of these compounds as catalysts.

It is of course also possible to use any other carbodiimidization catalysts. The at least partial carbodiimidization of component (a) is carried out in general using from 0.01 to 5% by weight, preferably from 0.2 to 2% by weight, based on component (a), of carbodiimidization catalysts of the type mentioned, within the temperature range from 0° to 200° C., preferably 20°–150° C. If the desire is for only a partial carbodiimidization of the isocyanate groups of component (a) it is recommended to terminate the carbodiimidization reaction at the particular degree of carbodiimidization required, by adding a catalyst poison. Examples of suitable catalyst poisons are described in DE-A-26 14 323.

In order to obtain partially carbodiimidized isocyanates which are storage-stable at room temperature it may be advisable to carry out the carbodiimidization reaction at 50°–200° C. with the specific use of catalysts which only contain [sic] their catalytic activity in this increased temperature range. This is described, for example, in EP-B-198 343.

The progress of the carbodiimidization reaction can be monitored via the evolution of carbon dioxide and the drop in the NCO content of the reaction mixture. The partial carbodiimidization generally does not produce uniform process products, but mixtures of carbodiimides with different contents of carbodiimide units per molecule and possibly still containing unreacted starting isocyanate.

All statements made above with regard to the content of carbodiimide groups in the process products and with regard to the number of carbodiimide groups per molecule therefore relate to average values.

The carbodiimidization reaction can be carried out in the presence or else in the absence of solvents. Examples of suitable solvents are toluene, xylene, cyclohexane, chlorobenzene, O-dichlorobenzene [sic], dimethylformamide, perchloroethylene, ethyl acetate, butyl acetate, diethylene glycol dimethyl ether, tetrahydrofuran, acetone, methyl ethyl ketone, cyclohexanone or any desired mixtures of such solvents. The solvent-free carbodiimidization product prepared solidifies to give a hard resin which is ground down to a powder and is subsequently used in accordance with the invention or can be processed further by reaction with component (b).

The reaction with component (b) which is possibly still to be carried out following the carbodiimidization reaction likewise takes place in the presence or in the absence of solvents of the type mentioned by way of example, within a temperature range of from 0° to 150°, preferably from 20° to 100° C.

In this context, when using different components (b), the reaction components can be reacted either simultaneously or in succession, the ratio of the isocyanate groups of the carbodiimidized component (a) to the groups of component (b) which are reactive towards isocyanate groups being from 1:1 to 1:1.5, preferably from 1:1 to 1:2.

Particularly preferred is a procedure which comprises carrying out the carbodiimidization reaction up to a degree of carbodiimidization such that, in the process product ultimately obtained, the required amount of carbodiimide groups is present. The product thus obtained is reacted with compounds (b) which contain ethylene oxide units and which may be difunctional, while observing a ratio of equivalents of NCO groups to groups which are reactive towards NCO groups of from 1.05:1 to 10:1, and subsequently reacting the free NCO groups which are then still present with chain terminators of the type mentioned by way of example under (b), while observing a ratio of equivalents of NCO groups to groups which are reactive towards NCO of from 1:1 to 1:1.5, preferably 1:1, or with a high excess of chain lengthening agents of the type described under (b), preferably while maintaining a ratio of equivalents of NCO groups to groups which are reactive towards NCO groups of at least 1:2, to give an NCO-free product.

Substantially equivalent to this particularly preferred procedure would be a procedure which comprises reacting the partially carbodiimidized diisocyanates having a mixture of difunctional hydrophilic structural components with chain terminators, while maintaining a ratio of equivalents of NCO groups to groups which are reactive to NCO groups of from 1:1 to 1:1.5.

After the reaction the solvent which may also have been used can be removed, for example by distillation. The solvent-free reaction product is generally a solid which can be taken up at any time in an organic solvent or else can be used in accordance with the invention without using solvents. For this purpose the carbodiimides can be added to the coating compositions in the form of aqueous solutions or dispersions, or else in bulk.

If desired, after introducing ethylene oxide and/or propylene oxide units, it is also possible for example to employ the carbodiimides described in DE-A-41 26 359, especially on page 2, line 1 to page 3, line 45.

The carbodiimides employed in accordance with the invention are particularly suitable for modifying polyurethane which contains carboxylate and/or carboxyl groups and/or sulfonate groups and is present in dispersion or dissolved in water, and for modifying polyester resins, polybutadienes or polyacrylate resins which are present in dispersion or dissolved in water and contain carboxylate groups and/or carboxyl groups and/or sulfonate groups.

The quantity of the carbodiimides employed in accordance with the invention depends, on the one hand, on the content of carboxylate groups and/or carboxyl groups in the dissolved or dispersed polymer and, on the other hand, on the desired range of properties of the coatings. For instance it may on the one hand be desired to select the ratio of carboxylate groups and/or carboxyl groups and/or sulfonate groups in the dissolved or dispersed binder to the carbodiimide groups so as to be greater than 1:1 in order, especially when using carbodiimides having more than 2 carbodiimide groups per molecule, to prevent excessive crosslinking of the product; on the other hand the use of at least equivalent amounts of carbodiimide groups, especially carbodiimides which (on average) are at least difunctional, enables the reaction time during the drying of the coatings ultimately obtained to be shortened.

Furthermore, the coating compositions according to the invention may contain as additive, together with or instead of the carbodiimides, a polyepoxide component (D). Examples of suitable polyepoxides are all known aliphatic and/or cycloaliphatic and/or aromatic polyepoxides, based for example on bisphenol A or bisphenol F.

Suitable examples of component (D) include the polyepoxides which are commercially available under the names Epikote® from Shell, Denacol from Nagase Chemicals Ltd., Japan, for example Denacol Ex-411 (pentaerythritol polyglycidyl ether), Denacol EX-321 (trimethylolpropane polyglycidyl ether), Denacol EX-512 (polyglycerol polyglycidyl ether) and Denacol EX-521 (polyglycerol polyglycidyl ether).

In the coating compositions according to the invention the polyepoxide component (D) is preferably employed in an amount such that the weight ratio of binder solids to polyepoxide solids is between 60:40 and 90:10, preferably between 70:30 and 85:15.

In order to prepare the ready-to-use, aqueous polyurethane coating composition, a mixture of polyisocyanate component (B) and carbodiimide component (C) and/or of polyepoxide component (D) is mixed shortly before application with binder component (A). The components can be mixed simply by stirring them together at room temperature or else by dispersion. The polyisocyanate component (B) is here employed in an amount such that the weight ratio between binder solids and polyisocyanate solids is from 60:40 to 90:10, particularly preferably from 70:30 to 85:15. The ratio of the number of free OH groups of component (A) to the number of isocyanate groups of component (B) is usually in the range from 1:2 to 2:1 in this context.

It is preferred to employ the carbodiimide component in an amount such that the weight ratio between binder solids (A) and carbodiimide solids (C) is between 60:40 and 90:10, preferably between 70:30 and 85:15. The ratio of the number of acid groups of binder (A) to the carbodiumide groups of component (C) is usually in the range between 1:2 and 2:1 in this context.

The aqueous polyurethane resin coating compositions according to the invention may also contain, in addition to the polyaddition and/or polycondensation resin employed in accordance with the invention, crosslinked polymer microparticles as disclosed in, for example, EP-A-38 127, and/or further compatible resins such as, for example, waterdilutable or water-soluble polyacrylate resins, polyurethane resins, polyester resins, alkyd resins or epoxy resin esters. The proportion of these further resins is usually between 1 and 10% by weight, based on the total weight of the coating composition. For instance, up to 30% by weight based on the binder solids of an acrylate prepared by emulsion polymerization and having an OH number which is preferably between 40 and 200 mg of KOH g may be added to the coating compositions according to the invention. The preparation of such emulsion polymers is described in, for example, DE-A-40 09 000, although the OH number of the acrylates is to be raised correspondingly.

Over and above this, the coating compositions according to the invention may also contain other conventional auxiliaries and additives such as, in particular, thickeners and wetting agents. It is preferred to add to the aqueous coating compositions according to the invention a nonionic polyurethane thickener, since this leads to a better transparency and better emulsifiability of the polyisocyanate. Preferably, the aqueous coating compositions according to the invention also have added to them a wetting agent based on an alkyl-modified polyether, since this likewise improves the transparency of the coating composition and the gloss and levelling of the coating composition.

Furthermore the aqueous coating compositions may also contain other conventional auxiliaries and additives, for example antifoams and the like. The quantity of auxiliaries and additives (incl. wetting agents and thickeners) employed is conventionally between 1 and 5% by weight, based on the total weight of the coating compositions.

The aqueous coating compositions according to the invention may also contain conventional organic solvents, whose proportion is kept as low as possible. This proportion is conventionally below 15% by weight, based on the total content of the volatile constituents.

The coating compositions according to the invention are generally adjusted to a pH of between 6.5 and 9.0. The pH can be adjusted using conventional amines such as, for example, triethylamine, dimethylaminoethanol and N-methylmorpholine.

The coating compositions according to the invention can be applied using conventional application methods such as, for example, spraying, knife coating, brushing, dipping, to any desired substrates such as, for example, metal, wood, plastic or paper. The coating compositions according to the invention are preferably employed for the production of top coats. The coating compositions according to the invention can be employed both in the production-line finishing and in the refinishing of car bodies. They are, however, preferably employed in the refinishing sector. The aqueous coating compositions according to the invention can be employed as fillers and for producing one-coat top coats, and as pigmented basecoats or as clearcoats in a process for the production of a multilayer finish (basecoat/clearcoat method). The coating compositions according to the invention are, however, preferably employed as clearcoats.

If the coating compositions according to the invention are employed for the production of single-coat top coats or as basecoats, then they can be pigmented with pigments such as, for example, pigments with an inorganic basis, for example titanium dioxide, iron oxide, carbon black etc. and/or pigments with an organic basis and/or metallic pigments such as, for example, aluminum bronzes, and/or pearlescent or interference pigments. Aluminum bronzes and pearlescent or interference pigments are examples of special-effect pigments. If the coating compositions according to the invention are employed as pigmented basecoats then they can be covered over with the coating compositions according to the invention which contain no pigments or only transparent pigments, although they can also be covered with conventional clearcoats based on organic solvents, with aqueous clearcoats or else with powder clearcoats.
The top coat compositions according to the invention have a solids content at spray viscosity which is high enough (20 to 50% by weight, preferably 32 to 45% by weight) to obtain, with 1 to 2 spray passes (cross passes), coating films of adequate thickness (the thickness of the baked coating film should preferably be between 25 and 70 µm) and give coating films having a very good appearance (good evenness, high gloss, good top coat holdout), good weathering resistance and good mechanical properties, and have a relatively low content of organic cosolvents (less than 35% by weight based on the total solids content of binders and crosslinking agents).

If the top coat compositions according to the invention are used together with water-dilutable base coat compositions in order to produce metallic finishes, then in the metallic finishes obtained the transparent top coat adheres particularly well to the basecoat. Suitable basecoats are, for example, the aqueous basecoat described in DE-A-40 09 000. Also suitable are all conventionally employed aqueous basecoats.

The following examples describe the invention in more detail. All parts and percentages are by weight unless expressly stated otherwise.

EXAMPLES 1 to 4

Comparative Examples 1 and 2

1. Preparation of a water-dilutable acrylate resin employed in accordance with the invention (A1)

24 parts by weight of ethoxyethyl propionate (EP) are introduced into a steel vessel fitted with monomer feed, initiator feed, thermometer, oil heating and reflux condenser and heated to 120° C. Then a solution of 6.0 parts by weight of t-butyl perethylhexanoate in 6.0 parts by weight of ethoxyethyl propionate is added at a rate such that the addition is concluded after 4 h 30 min. The commencement of the addition of the t-butyl perethylhexanoate solution is accompanied by the beginning of the addition of the monomer mixture of (a1), (a2), a3) and (a4)

(a1): 20.0 parts by weight of n-butyl methacrylate 17.4 parts by weight of methyl methacrylate, 10.0 parts by weight of lauryl acrylate (commercial product Methacrylester 13 from Rhöim AG, Darmstadt)

(a6): 15.0 parts by weight of styrene (a2): 32.5 parts by weight of hydroxyethyl methacrylate (a3): 5.1 parts by weight of acrylic acid.

The mixture (a1), (a2), (a3) and (a6) is added at a rate such that the addition is concluded after 4 hours. When the addition of the t-butyl perethylhexanoate solution is over the reaction mixture is maintained at 120° C. for a further 2 h. The resin solution is then cooled to 80° C. and neutralized over a period of about 30 min with dimethylethanolamine, to a degree of neutralization of 60 %.

Then a quantity of water is added until the solids content of the dispersion is about 40% by weight. Organic solvent is removed by azeotropic distillation under vacuum from this dispersion until no more than 3% can be detected (by GC). Whereas the organic solvent was [sic] separated off, the water is returned to the reactor.

At the end of the distillation the dispersion is adjusted, by adding deionized water, to the following final parameters:

Acid number of the total solids: 40 mg of KOH/g of solids;

OH number of the total solids: 140 mg of KOH/g of solids;

solids content (1 h, 130° C): 39.0%.

2.1 Preparation of a carbodiimide 1 employed in accordance with the invention (C1)

475 parts of (1,3-bis(2-isocyanatoprop-2-yl)benzene (commercial product TMXDI (Meta)® from American Cynamid [sic] Comp.) and 119 g of isophorone diisocyanate together with 14 parts of 3-methyl-1-phenyl-2-phospholene 1-oxide are placed in a reactor. They are heated under a nitrogen atmosphere at 155° C. until the isocyanate content has reached 6.5% (approximately after 19 h). The reaction mixture is then cooled to 50° C. before 143 parts of methoxy polyethylene glycol having a molecular weight of 550 and 0.6 parts of dibutyl tin dilaurate are added. The mixture is stirred at 50° C. until a constant isocyanate content of about 4.2% has been reached. Then at 50° C. 142 parts of ethanol are added and the mixture is stirred until no free NCO is determined.

The remaining ethanol is distilled off under vacuum and the batch is diluted with metoxypropyl [sic] acetate to a solids content of 79%.

2.2 Preparation of the carbodiimide 2 employed in accordance with the invention 50 parts of a tetraisopropyldiphenyl-methanecarbodiimide (prepared according to DE-A 41 26 359), in which the remaining NCO groups had been partially urethanized with ethanol (8% free NCO groups) were reacted with 25 parts of a commercially available polyether alcohol of the propylene glycol type having an average molecular weight of 900 (commercial product Pluriol® P 900 from BASF AG) and 0.1 parts of dibutyl tin dilaurate (DBTL) for 6 hours at 80° C. The solids content was adjusted to 60% using methoxypropyl acetate and the product was drained off.

3.) Preparation of transparent aqueous top coat compositions according to the invention Transparent top coat compositions are prepared from the acrylate dispersion prepared according to point A, an 80% strength solution of a commercially available water-dilutable polyisocyanate resin in ethyl ethoxypropionate, based on hexamethylene diisocyanate dimer/trimer, containing uretdione groups (commercial product Desmodur® N 3400 from Bayer AG), if desired the carbodiimide 1 or 2, if desired a commercially available aromatic polyepoxide having an epoxide equivalent weight of 231 (commercial product Denacol EX-411 from Nagase Chemical Ltd., Japan), butylglycol, methyl isobutyl ketone, ethoxyethyl propionate, a 10% strength aqueous solution of a commercially available polyurethane thickener (Dapral T 210 from Akzo), distilled water, a commercially available siloxane-modified surface additive (commercial product Tego Flow 425 from Goldschmidt, Essen) and a surface-active agent based on silicone (commercial product Byk 331 from Byk), and these compositions are adjusted using distilled water to spray viscosity (22 to 25 s efflux time from the DIN-4 cup (in accordance with DIN 53 211, 1974)). The composition of the top coat compositions is shown in Table 1.

4.) Application of the transparent top coat compositions according to the invention and testing of the baked coating films A water-dilutable basecoat composition pigmented with aluminum flakes, according to EP-A-279 813, is applied to a phosphatized steel panel coated with a commercially available electrodeposition coating and a commercially available filler so as to give a dry film thickness of from 12 to 15 $\mu$m. The applied basecoat composition is dried for 10 min at room temperature and 10 min at 60° C. A top coat composition obtained as in point B) is then sprayed onto the basecoat in 3 spray passes with a flashoff time of 15 min in between. The panel is finally dried for 60 min at room temperature and baked for 30 min at 60° C. in a circulating-air oven. The resulting multilayer coatings were subjected to a number of tests. The test results are shown in Table 2.

TABLE 2

Composition of the transparent, aqueous top coat compositions from Examples 1 to 3 and Comparative Examples 1 and 2

|  | Example 1 | Example 2 | Example 3 | Example 4 | Comparative Example 1 | Comparative Example 2 |
|---|---|---|---|---|---|---|
| Acrylate dispersion | 56.6 | 56.1 | 56.1 | 56.1 | 58.0 | 60.0 |
| Distilled water | 5.7 | 5.6 | 5.6 | 5.6 | 5.9 | 6.0 |
| Daspral T210 (10%) | 1.4 | 1.4 | 1.4 | 1.4 | 1.4 | 1.4 |
| Butyl glycol | 1.1 | 1.1 | 1.1 | 1.1 | 1.1 | 1.1 |
| Methyl isobutyl ketone | 1.1 | 1.1 | 1.1 | 1.1 | 1.1 | 1.1 |
| Ethoxyethyl propionate | 2.3 | 2.3 | 2.3 | 2.3 | 2.3 | 2.3 |
| Byk 331 | 0.1 | 0.1 | 0.1 | 0.1 | 0.1 | 0.1 |
| Tego Flow 425 | 0.1 | 0.1 | 0.1 | 0.1 | 0.1 | 0.1 |
| Distilled water | 2.3 | 2.2 | 2.2 | 2.2 | 2.3 | 2.3 |
| Desmodur N3400 | 13.0 | 12.9 | 12.9 | 12.9 | 13.5 | — |
| Carbodiimide 1 | 1.1 | - | 1.1 | - | - | 7.0 |
| Carbodiimide 2 | — | 1.2 | - | - | - | - |
| Denacol EX-411 | — | - | 1.0 | 2.8 | - | - |
| Ethoxyethyl propionate | 3.2 | 3.2 | 3.2 | 3.2 | 3.2 | 6.1 |
| Distilled water | 12.0 | 12.7 | 11.8 | 11.1 | 11.0 | 12.5 |
| Solids content (%) | 40 | 39 | 41 | 41 | 39 | 39 |
| Solvent (%) | 12.2 | 12.2 | 12.0 | 12.0 | 12.0 | 14.0 |
| Viscosity (DIN 4 cup)s | 23 | 22 | 23 | 24 | 25 | 22 |

TABLE 2

Test results

|  | Example 1 before / after Exposure | Example 2 before / after Exposure | Example 3 before / after Exposure | Example 4 before / after Exposure | Comp. Ex. 1 before / after Exposure | Comp. Ex. 2 before / after Exposure |
|---|---|---|---|---|---|---|
| Solids content[1] | 40% | 39% | 41% | 41% | 39% | 39% |
| Coat thickness (lm)[2] | 50 | 50 | 50 | 50 | 50 | 50 |
| CC test[3] (3 days) | | | | | | |
| Blistering | m0/g0  m1/g1 | m0/g0  m2/g1 | m0g/0  m1/g1 | m0/g0  m2/g1 | m0/g0  m2/g2 | m0/g0  m3/g3 |
| Swelling | 0  4 | 0  4 | 0  2 | 0  4 | 0  5 | 0  5 |
| Cratering | 0  0 | 0  0 | 0  0 | 0  0–1 | 0  1 | 0  1 |
| CC test[3] (10 days) | | | | | | |
| Blistering | m0/g0  m2/g1 | m0/g0  m3/g3 | m0/g0  m2/g1 | m0/g0  m3/g3 | m0/g0  m4/g3 | m0/g0  m5/g3 |
| Swelling | 0  5 | 0  5 | 0  3 | 0  5 | 0  5 | 0  5 |
| Cratering | 0  0 | 0  0 | 0  0 | 0  1 | 0  2 | 0  3 |
| WS test[4] (5 cycles) | | | | | | |
| Blistering | m0/g0  m0/g0 | m0/g0  m0/g0 | m0/g0  m0/g0 | m0/g0  m1/g1 | m0/g0  m1/g1 | m0/g0  m3/g2[4] |
| Swelling | 0  2–3 | 0  2–3 | 0  1–2 | 0  3 | 0  3–4 | 0  4[4] |
| Pendulum hardness | | | | | | |
| König RT | 105 | 97 | 118 | 119 | 103 | 55 |
| 30' 60° C. | 126 | 120 | 145 | 148 | 126 | 74 |

We claim:

1. Aqueous multicomponent polyurethane coating composition comprising
   A) a water-dilutable resin selected from the group consisting of polyaddition resin (A1), polycondensation resin (A2), and mixtures thereof, wherein the resin contains groups selected from the group consisting of hydroxyl, carboxylate, and sulfonate groups, and mixtures thereof, and having an OH number of from 40 to 200 mg of KOH/g, an acid number of from 15 to 100 mg of KOH/g, and a glass transition temperature of from −40° C. to +60° C.
   B) a polyisocyanate component (B) as crosslinking agent and at least one additive, selected from the group consisting of a carbodiimide component (C), a polyepoxide component (D) and mixtures thereof,
wherein the carbodiimide component (C) has a content of carbodiimide groups —N=C=N— of from 2 to 30% by weight, on average at least 0.8 carbodiimide groups per molecule and from 0 to 25% by weight, based on solids, of chemically incorporated ethylene oxide and/or propylene oxide units which are present within polyether chains.

2. Coating composition according to claim 1, wherein carbodiimide component (C) is contained in an amount such that the weight ratio of binder component (A) to carbodiimide (C) is between 90:10 and 60:40.

3. Coating composition according to claim 1, wherein the carbodiimide component has a content of carbodiimide groups —N=C=N— of from 5 to 15% by weight, on average from 1 to 25 carbodiimide groups per molecule and from 2 to 20% by weight, based on solids, of chemically incorporated ethylene oxide and/or propylene oxide units present within polyether chains.

4. Coating composition according to claim 1 wherein carbodiimide component (C) has been prepared by reacting at least one compound selected from the group consisting of aliphatic diisocyanates, cycloaliphatic di-isocyanates, aliphatic polyisocyanates, aromatic polyisocyanates and mixtures thereof, with alcohols containing ethylene oxide and/or propylene oxide units.

5. Coating composition according to claim 4, wherein carbodiimide component (C) has been prepared using tetramethylene-xylylenediisocyanate as the sole isocyanate component.

6. Coating composition according to claim 1, wherein the additive is a carbodiimide component (C).

7. Coating composition according to claim 1, wherein polyepoxide component (D) is selected from the group consisting of aliphatic, cycloaliphatic and aromatic polyepoxides and mixtures thereof.

8. Coating composition according to claim 1, wherein binding component (A) is a water-dilutable polyacrylate resin (A1) which is obtained by polymerizing, in an organic solvent or solvent mixture and in the presence of at least one polymerization initiator
   a1) a (meth)acrylate which is different from (a2), (a3), (a4), (a5) and (a6), is copolymerizabhe with (a2), (a3), (a4), (a5) and (a6) and is essentially free from carboxyl groups, or a mixture of such monomers,
   a2) an ethylenically unsaturated monomer which is copolymerizable with (a1), (a3), (a4), (a5) and (a6), is different from (a5), carries at least one hydroxyl group per molecule and is essentially free from carboxyl groups, or a mixture of such monomers,
   a3) an ethylenically unsaturated monomer which carries at least one carboxyl group per molecule and is copolymerizable with (a1), (a2), (a4), (a5) and (a6), or a mixture of such monomers, and
optionally compounds a4)–a6) selected from the group consisting of
   a4) one or more vinyl esters of -branched monocarboxylic acids having from 5 to 18 carbon atoms per molecule,
   a5) compounds selected from the group consisting of
      (i) at least one reaction product of acrylic acid and/or methacrylic acid with the glycidyl ester of an α-branched monocarboxylic acid having from 5 to 18 carbon atoms per molecule, and
      (ii) an equivalent amount of acrylic and/or methacrylic acid which is reacted during or after the polymerization reaction with the glycidyl ester of an -branched monocarboxylic acid having from 5 to 18 carbon atoms per molecule, and
   a6) an ethylenically unsaturated monomer which is copolymerizable with (a1), (a2), (a3), (a4) and (a5), is different from (a1), (a2), (a3), (a4) and (a5) and is essentially free from carboxyl groups, or a mixture of such monomers,
and, after the end of the polymerization, at least partially neutralizing the resulting polyacrylate resin and dispersing it in water, the nature and quantity of (a1), (a2), (a3), (a4), (a5) and (a6) being selected such that the polyacrylate resin (A1) has the desired OH number, acid number and glass transition temperature.

9. Aqueous coating composition according to claim 8, wherein water-dilutable polyacrylate resin (A1) is obtained by
   (I) polymerizing a mixture of (a1), (a2), (a4), (a5) and (a6), or a mixture of part-amounts of components (a1), (a2), (a4), (a5) and (a6) in an organic solvent,
   (II) after at least 60% by weight of the mixture composed of (a1), (a2), (a4), (a5) and if desired (a6) have been added, adding (a5) and any remaining amount of components (a1), (a2), (a4), (a5) and (a6) and continuing polymerization, and
   (III) after the end of the polymerization, at least partially neutralizing the resulting polyacrylate resin and dispersing it in water.

10. Aqueous coating composition according to claim 8, wherein component (a2) comprises trimethylolpropane monoallyl ether.

11. Aqueous coating composition according to claim 1, wherein water-dilutable polyacrylate resin (A1) is obtained from
   (a1) from 30 to 50% by weight, of component (a1)
   (a2) from 15 to 35% by weight, of component (a2)
   (a3) from 2 to 8% by weight, of component (a3)
   (a4) from 2 to 15% by weight, of component (a4)
   (a5) from 2 to 15% by weight, of component (a5) and
   (a6) from 10 to 20% by weight, of component (a6), the sum of the proportions by weight of components (a1) to (a6) being in each case 100% by weight.

12. Process for the preparation of an aqueous multicomponent polyurethane coating composition according to claim 1 wherein shortly before application the isocyanate group-containing crosslinking agent, the additive and the water-dilutable resin (A) are mixed.

13. Process according to claim 12, wherein shortly before application a crosslinking component (I) which contains the isocyanate group-containing crosslinking agent, the additive, and a binder component (II) which contains the water-dilutable resin (A), are mixed.

14. Method of producing a multilayer, coating on a substrate surface, comprising
(1) applying a pigmented basecoat composition to the substrate surface,
(2) forming a polymer film from the composition applied in stage (1),
(3) applying a transparent aqueous top coat composition comprising a water-dilutable polyacrylate resin binder and a polyisocyanate crosslinking agent to the resulting basecoat, and subsequently
(4) curing the basecoat together with the top coat,
wherein the top coat composition applied is an aqueous coating composition according to claim 1.

15. Article coated with a multicoat finish, wherein one of the coats has been produced using an aqueous coating composition according to claim 1.

16. An automotive refinish top coat comprising the aqueous multicomponent polyurethane coating composition of claim 1.

17. Coating composition according to claim 1, wherein the polyepoxide component (D) is contained in an amount such that the weight ratio of binder component (A) to polyepoxide (D) is between 85:15 and 70:30, the weight ratios being based in each case on solids.

18. Coating composition according to claim 1, wherein carbodiimide component (c) is contained in an amount such that the weight ratio of binder component (A) to carbodiimide (C) is between 85:15 and 70:30, the weight ratios being based in each case on solids.

19. Coating composition according to claim 1, wherein the additive is a mixture of a carbodiimide component (C) and a polyepoxide component (D).

20. Aqueous coating composition according to claim 8 wherein component (a4) comprises one or more vinyl esters of -branched, saturated aliphatic monocarboxylic acids having from 9 to 11 carbon atoms.

21. Aqueous coating composition according to claim 8 wherein component (a5) comprises a compound selected from the group consisting of the reaction product of acrylic and/or methacrylic acid with the glycidyl ester of Versatic acid, an equivalent amount of acrylic and/or methacrylic acid which is then reacted during or after the polymerization reaction with the glycidyl ester of Versatic acid.

22. Aqueous coating composition according to claim 20 wherein component (a5) comprises a compound selected from the group consisting of the reaction product of ((meth)acrylic acid with the glycidyl ester of Versatic acid, and an equivalent amount of (meth)acrylic acid which is then reacted during or after the polymerization reaction with the glycidyl ester of Versatic acid.

23. An aqueous multicomponent polyurethane coating composition comprising
A) a water-dilutable resin selected from the group consisting of polyaddition resin (A1), polycondensation resin (A2), and mixtures thereof, wherein the resin contains groups selected from the group consisting of hydroxyl, carboxylate, and sulfonate groups, and mixtures thereof, and having an OH number of from 40 to 200 mg of KOH/g, an acid number of from 15 to 100 mg of KOH/g, and a glass transition temperature of from −40° C. to +60° C.
B) a polyisocyanate component (B) as crosslinking agent and
at least one additive comprising a carbodiimide component (C)having a content of carbodiimide groups —N=C=N— of from 2 to 30% by weight, on average at least 0.8 carbodiimide groups per molecule and from 2 to 25% by weight, based on solids, of chemically incorporated ethylene oxide and/or propylene oxide units which are present within polyether chains.

24. An aqueous multicomponent polyurethane coating composition comprising
A) a water-dilutable resin selected from the group consisting of polyaddition resin (A1), polycondensation resin (A2), and mixtures thereof, wherein the resin contains groups selected from the group consisting of hydroxyl, carboxylate, and sulfonate groups, and mixtures thereof, and having an OH number of from 40 to 200 mg of KOH/g, an acid number of from 15 to 100 mg of KOH/g, and a glass transition temperature of from −40° C. to +60° C., which is obtained by polymerizing, in an organic solvent or solvent mixture and in the presence of at least one polymerization initiator:
a1) a (meth)acrylate which is different from (a2), (a3), (a4), (a5) and (a6), is copolymerizable with (a2), (a3), (a4), (a5) and (a6) and is essentially free from carboxyl groups, or a mixture of such monomers,
a2) an ethylenically unsaturated monomer which is copolymerizable with (a1), (a3), (a4), (a5) and (a6), is different from (a5), carries at least one hydroxyl group peer molecule and is essentially free from carboxyl groups, or a mixture of such monomers,
a3) an ethylenically unsaturated monomer which carries at least one carboxyl group per molecule and is copolymerizable with (a1), (a2), (a4), (a5) and (a6), or a mixture of such monomers, and
optionally compounds a4)–a6) selected from the group consisting of
a4) one or more vinyl esters of -branched monocarboxylic acids having from 5 to 18 carbon atoms per molecule,
a5) compounds selected from the group consisting of
(i) at least one reaction product of acrylic acid and/or methacrylic acid with the glycidyl ester of an α-branched monocarboxylic acid having from 5 to 18 carbon atoms per molecule, and
(ii) an equivalent amount of acrylic and/or methacrylic acid which is reacted during or after the polymerization reaction with the glycidyl ester of an -branched monocarboxylic acid having from 5 to 18 carbon atoms per molecule, and
a6) an ethylenically unsaturated monomer which is copolymerizable with (a1), (a2), (a3), (a4) and (a5), is different from (a1), (a2), (a3), (a4) and (a5) and is essentially free from carboxyl groups, or a mixture of such monomers,
and, after the end of the polymerization, at least partially neutralizing the resulting polyacrylate resin and dispersing it in water, the nature and quantity of (a1), (a2), (a3), (a4), (a5) and (a6) being selected such that the polyacrylate resin (A1) has the desired OH number, acid number and glass transition temperature,
B) a polyisocyanate component (B) as crosslinking agent, and at least one additive, selected from the group consisting of a carbodiimide component (C), a polyepoxide component (D) and mixtures thereof, wherein the carbodiimide component (C) has a content of carbodiimide groups —N=C=N— of from 2 to 30% by weight, on average at least 0.8 carbodiimide groups per molecule and from 0 to 25% by weight, based on solids, of chemically incorporated ethylene oxide and/or propylene oxide units which are present within polyether chains.

* * * * *